April 13, 1965 W. I. CALDWELL 3,178,151
LINEAR DISPLACEMENT ELECTROMAGNETIC ACTUATOR
Filed Jan. 23, 1963 2 Sheets-Sheet 1
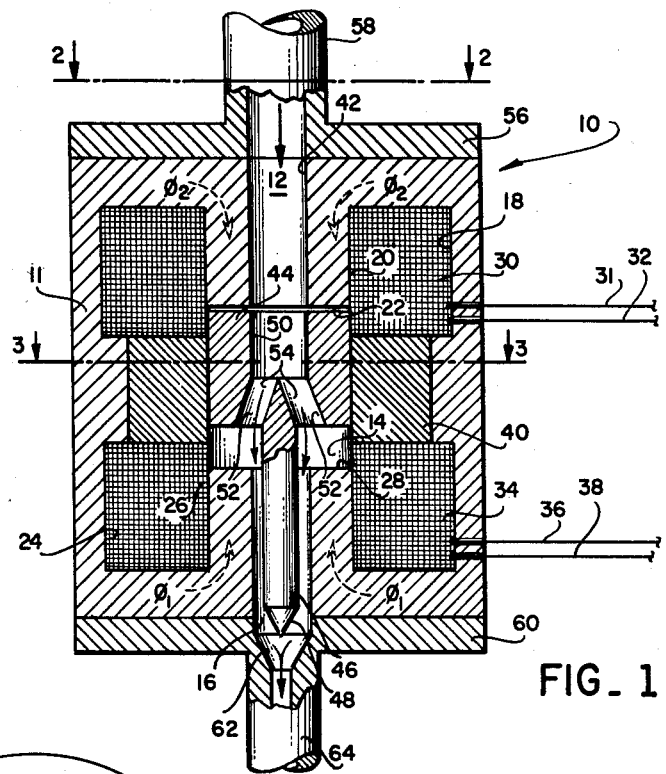
FIG_1
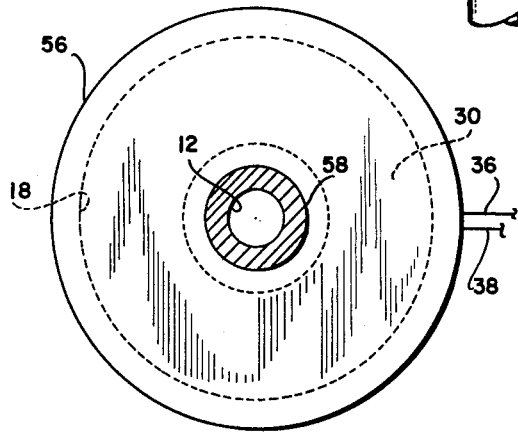
FIG_2
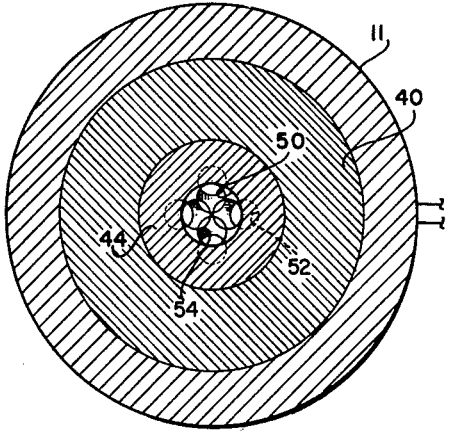
FIG_3
INVENTOR.
WILLIAM I. CALDWELL
BY
R. E. Geangue
Attorney

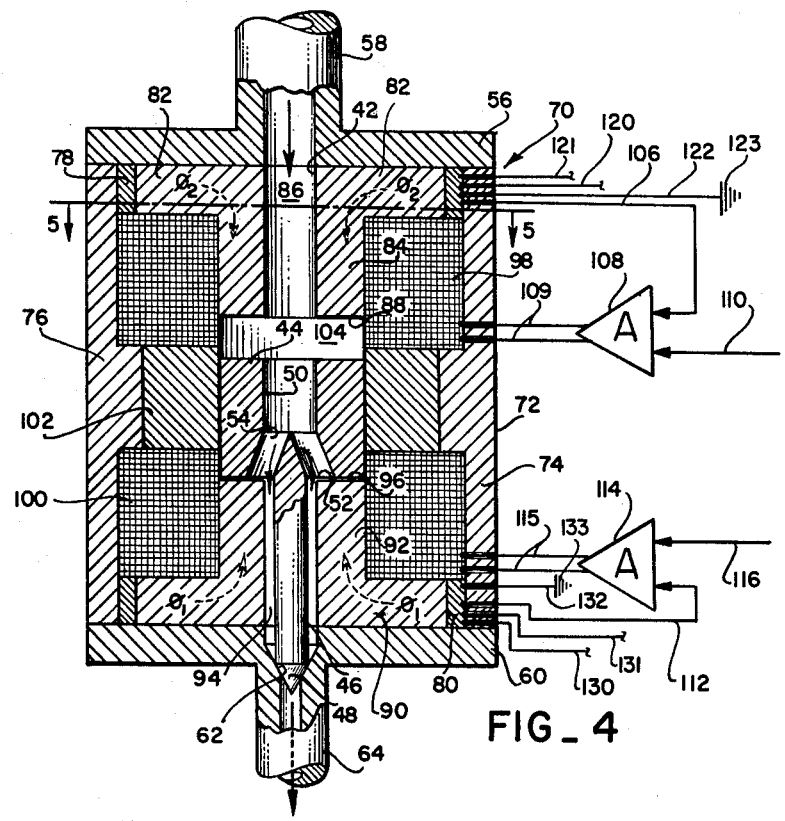
FIG_4
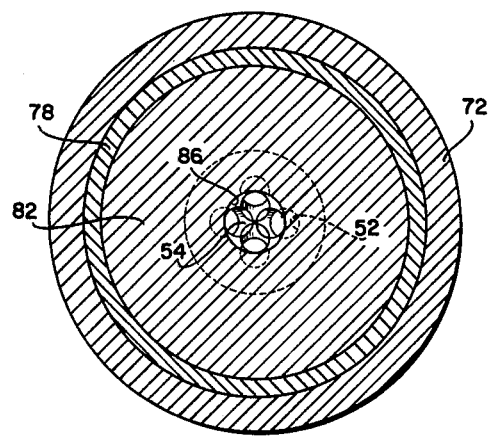
FIG_5
INVENTOR.
WILLIAM I. CALDWELL
BY
R. E. Geangue
Attorney

United States Patent Office 3,178,151
Patented Apr. 13, 1965

3,178,151
LINEAR DISPLACEMENT ELECTROMAGNETIC
ACTUATOR
William I. Caldwell, Canoga Park, Calif., assignor to The
Marquardt Corporation, Van Nuys, Calif., a corporation of California
Filed Jan. 23, 1963, Ser. No. 253,408
2 Claims. (Cl. 251—137)

The present invention relates to linear displacement electromagnetic actuators and, more particularly, to such actuators which may be employed to position devices without the use of intervening linkage or springs.

In torque motor actuators employed in devices controlling the flow of dangerous fluids, such as corrosive acids or radio-active liquids, it has long been a problem to satisfactorily seal actuator parts which are in contact with the dangerous fluids from those which are not in contact with the fluids because these parts must be connected together by means of pin joints or the like.

In such situations, it is not possible to completely isolate the elements which are to be sealed from the fluids because of the relative movement or pivoting of the elements making up the pin joints with respect to a suitable barrier.

Although conventional solenoids provide positive isolation of the actuating means by propagating magnetic flux through sealed walls, these devices, while generally satisfactory, do have certain drawbacks. One drawback resides in the fact that a spring is often employed to hold a valve open or to hold it shut. When such a valve is to be actuated, electrical power is applied to the solenoid to magnetize an armature and create a force which opposes the force of the spring. This force requirement often results in solenoids which are larger in size and weight than would be desired. Furthermore, since power must be continuously applied to hold the device in the position opposing the spring force, the electrical power consumption may become excessive in certain applications of the valve. Another drawback resides in the fact that electrical power requirements for actuation of such devices may result in relatively high heat liberation which is not desirable when such devices are employed in aircraft or space craft.

In view of the foregoing factors and conditions characteristic of torque motor actuators and spring-biased solenoids employed to control the flow of dangerous fluids, it is a primary object of the present invention to provide a new and useful linear displacement electromagnetic actuator not subject to the disadvantages enumerated above and having an armature isolated from coils and from a permanent magnet by an inelastic wall without the use of conventional pivot joints and without being spring-biased.

Another object of the invention is to provide an electromagnetic actuator having a high force-to-weight ratio.

Yet another object of the present invention is to provide an electromagnetic actuator producing a linear output motion.

Still another object of the present invention is to provide an electromagnetic actuator requiring a minimum of power consumption in use.

A further object of the invention is to provide an electromagnetic actuator having an increased operating speed.

A still further object of the present invention is to provide an electromagnetic actuator having a self-latching action.

Another object of the present invention is to provide an electromagnetic actuator which liberates a minimum amount of heat in operation.

According to one embodiment of the present invention, a valve controlling the flow of a dangerous fluid is positioned to a fully open condition or a fully closed condition by means of a linear displacement electromagnetic actuator.

The actuator has an upper cover plate and fluid inlet pipe as well as a lower cover plate and fluid exit pipe made of suitable non-magnetic material. The plates cover the ends of a cylindrical core of magnetic material. The core includes an upper leg, a lower leg and a central member. A first coil is fitted between the upper leg and the central member of the core and a second coil is located between the lower leg and central member of the core.

The inlet pipe leads through a cylindrical passageway into an enlarged cylindrical chamber in which an armature of piston-like shape and having a valve member is slidably mounted. A flow passage with several exit passages is mounted in the armature and the valve member is adapted to seat on a valve seat in the exit pipe.

A radially-magnetized, ring-shaped permanent magnet surrounds the armature to produce predetermined flux patterns in the core so that, after the electrical energy supplying the coils is shut off, the armature will be maintained in its then position. That is, voltage may be applied to the coils to snap the valve open or closed by moving the armature in a predetermined direction and, then when the electrical power is terminated, the permanent magnet will maintain the armature in its open or closed position.

If desired, a flux sensor, such a Hall effect transducer type, may be employed to actuate an amplifier to modulate the input power to a given coil which reduces the flux at a given pole face to zero.

The features of the present invention which are believed to be novel are set forth with particularity in the appended claims. The present invention, both as to its organization and manner of operation, together with further objects and advantages thereof, may best be understood by reference to the following discussion, taken in connection with the accompanying drawings, in which:

FIGURE 1 is a vertical, cross-sectional view, with parts shown in elevation, of a linear displacement electromagnetic actuator constituting a first embodiment of the present invention, which is shown for purposes of illustration, but not of limitation, as a valve actuator;

FIGURE 2 is a plan view of the device of FIGURE 1;

FIGURE 3 is a transverse, cross-sectional view, taken along line 3—3 of FIGURE 1;

FIGURE 4 is a vertical, cross-sectional view, with parts shown in elevation, of a linear displacement electromagnetic actuator constituting a second embodiment of the present invention, which is shown for purposes of illustration, but not of limitation, as a valve actuator; and FIGURE 5 is a transverse, cross-sectional view taken along line 5—5 of FIGURE 4.

Referring again to the drawings, and particularly to FIGURES 1-3, the linear displacement electromagnetic actuator constituting a first embodiment of the present invention, generally designated 10, includes a cylindrical body 11 of magnetic material constituting a cylindrical core. A first centrally-located, cylindrical passageway 12 is formed in the upper portion of body 11 and extends into an enlarged, cylindrical chamber 14. A second centrally-located, cylindrical passageway 16 is formed in the lower end of body 11 and communicates with the chamber 14.

A first annular, coil-receiving chamber 18 is formed in the upper portion of body 11 in such a manner that an annular skirt 20 depends from the upper portion of body 11 to a point superjacent the chamber 14. The lower edge of the skirt 20 forms an annular pole face 22. A second annular, coil-receiving chamber 24 is formed in the lower portion of body 11 in such a manner that an upstanding, annular skirt 26 is formed which extends to a point subjacent the chamber 14. The upper edge of the skirt 26 constitutes a pole face 28.

A first electrical coil 30 is mounted in the upper chamber 18 and includes electrical leads 31 and 32 which may be employed to connect the coil 30 to a suitable source of electrical power, not shown. A second electrical coil 34 is mounted in the lower chamber 24 and includes electrical leads 36 and 38 which may be employed to connect coil 34 to a suitable source of electrical power, not shown.

A radially-magnetized, ring-shaped permanent magnet 40 is mounted in the body 11 intermediate the coils 30 and 34 and encompasses chamber 14. A corrosion-resistant lining 42 forms an encompassing sidewall in the upper passageway 12, the chamber 14 and the lower passageway 16. While many types of corrosion-resistant linings will manifest themselves, one such lining found to be satisfactory is a non-magnetic stainless steel.

A cylindrical armature 44 is slidably mounted in chamber 14 and includes an integral valve stem 46 and a valve member 48. The upper portion of the armature 44 is bored to form a cylindrical fluid passageway 50 and a plurality of fluid discharge ports 52 are formed in the bottom of armature 44 by boring the lower end of armature 44 at spaced points on an angle so that passageways 54 will connect discharge ports 52 with the passageway 50. The armature 44 may be of a magnetic-type stainless steel or it may comprise a coated soft iron core, not shown.

An upper cover plate 56 of suitable non-magnetic material closes the upper end of body 11 and includes a fluid inlet pipe 58 which communicates with the passageway 12. A lower cover plate 60 of suitable non-magnetic material closes the lower end of body 11 and includes an annular valve seat 62 which is positioned at the lower end of discharge passageway 16. The cover plate 60 also includes a fluid discharge pipe 64. The valve stem 46 extends through fluid discharge passageway 16 and is of sufficient length that the valve member 48 will seat on valve seat 62 when armature 44 is in its lowermost position.

Operation of the first embodiment of the present invention will be readily understood.

Assuming that the valve member 48 is seated on valve seat 62, then the gap between the lower pole face 28 and armature 44 is smaller than the gap between the upper pole face 22 and armature 44. Consequently, the flux $\phi_1$, through skirt 26 and pole face 28 is larger than the flux $\phi_2$ through skirt 20 and pole face 22. To open the valve, a voltage is applied to the coils 30 and 34 of such a polarity that flux $\phi_2$ increases until it is larger than $\phi_1$ so that an upward force moves armature 44 toward pole face 22 unseating valve member 48. The voltage to coils 30 and 34 may then be cut off to minimize any heat liberated by the coils. With no voltage being supplied, permanent magnet 40 produces flux $\phi_2$ in skirt 20 and $\phi_1$ in skirt 26. Since armature 44 is in its up position, the shortened air gap between armature 44 and pole face 22 results in flux $\phi_2$ exceeding $\phi_1$. Therefore, with no applied voltage, armature 44 will remain in its up position until it is desired to seat valve member 48.

When it is desired to close the valve, voltage is applied to coils 30 and 34 of such a polarity that $\phi_1$ exceeds $\phi_2$ and the armature 44 is driven downwardly to seat valve 48 on valve seat 62. The coils may then be deactivated and permanent magnet 40, acting through the reduced air gap at pole face 28, maintains the valve 48 in its seated position because $\phi_1$ exceeds $\phi_2$.

The valve member 48 may also be unseated by applying a voltage to only the coil 30 in a direction to add to the value of flux $\phi_2$ generated by the permanent magnet 40. Conversely, the valve member 48 may be seated by applying a voltage to only coil 34 in a direction to add to the value of flux $\phi_1$ which is generated by the permanent magnet 40. Operation in this manner strengthens the magnetization of the permanent magnet 40.

Thus, it is seen that the valve actuator 10 exhibits a toggle action characteristic. After unseating the valve member 48, the armature 44 maintains the valve 48 in a stabilized, open position and when closed, it remains closed in a stabilized position. Since the coils 30 and 34 are not required to produce a continuous magnetic force to oppose a spring force, as in the case of many conventional solenoids, voltage is required by only one of the coils during the brief interval of actuation or change in valve position. Because of this very brief interval required for actuation, the electrical power consumption and heat liberation of the actuator 10 are at a minimum.

Referring now to FIGURES 4 and 5, a second embodiment of the present invention, generally indicated as 70, includes a body 72 having an encompassing sidewall 74 and an integral, annular flange 76. A first flux sensor 78, which may be of the conventional, Hall effect, transducer type, is positioned in the upper, open end of body 72. A second flux sensor 80, which may also be of the conventional, Hall effect, transducer type, is positioned in the lower, open end of the body 72. An upper, annular pole piece 82 is positioned in the upper end of body 72 adjacent the first sensor 78 and includes a depending skirt 84. A fluid passageway 86 is formed in the upper pole piece 82 and the lower edge of skirt 84 forms a pole face 88. A lower, annular pole piece 90 is positioned in the lower open end of body 72 and includes an upstanding, annular skirt 92. A fluid conducting passageway 94 is formed in pole piece 90 and the upper edge of skirt 92 forms a pole face 96. An upper, ring-shaped coil 98 encompasses the skirt 84 and a lower ring-shaped coil 100 encompasses the skirt 92. A radially-magnetized, ring-shaped permanent magnet 102 is positioned in body 72 adjacent the flange 76 intermediate the coils 98 and 100.

An armature 44 includes a passageway 50 and ports 52 identical to those shown in FIGURE 1 and is slidably mounted in a chamber 104 formed by the inner walls of the ring-shaped coils and permanent magnet 102. An upper cover plate 56 and inlet pipe 58, identical to those shown in FIGURE 1, are rigidly affixed to the upper end of body 72 and a lower end cap 60 and fluid outlet pipe 64, identical to those shown in FIGURE 1, are rigidly affixed to the lower end of body 72. The armature 44 includes a depending valve stem 46 and valve member 48 which seats on an annular valve seat 62 forming a part of fluid discharge pipe 64. A lining 42, identical to that shown in FIGURE 1, may be employed to resist corrosion from fluid flowing through inlet pipe 58, passageway 86, chamber 104, armature 44, passageway 50, ports 52, passageway 94 and discharge pipe 64.

The first senor 78 is connected by means of a lead 106 to a first amplifier 108 which, in turn, is connected to coil 98 by means of leads 109. A lead 110 brings a command signal into the amplifier 108. The second sensor 80 is connected by means of a lead 112 with an amplifier 114 which, in turn, is connected to the coil 100 by means of leads 115. A lead 116 brings a command signal into the amplifier 114. Excitation leads 120 and 121 connect the sensor 78 to a suitable source of power, not shown, and a lead 122 connects sensor 78 to a ground 123. Excitation leads 130 and 131 connect sensor 80 to a suitable source of power, not shown, and a lead 132 connects sensor 80 to a ground 133.

To unseat valve member 48, a command signal voltage is sent through lead 110 to amplifier 108 calling for a larger value for $\phi_2$ than its saturation value. Amplifier 108 compares the command signal with a signal being received through lead 106 and sends enough current through leads 109 to coil 98 to raise $\phi_2$ to its saturation value. At the same time, a command signal is sent to amplifier 114 through lead 116 calling for a zero $\phi_1$ value. Amplifier 114 compares this signal with a signal being received from sensor 80 through lead 112 and supplies coil 100 through leads 115 with a current which makes and maintains $\phi_1$ at zero. Thus, a greater force is available to drive armature 44 toward pole face 88 than that which is available in the embodiment of FIGURE 1 where, without the transducer 78, it is possible to reverse flux $\phi_1$ when only coil 30 is energized. Once the valve is opened, the current to coils 98 and 100 and transducers 78 and 80 may be terminated and magnet 102 will maintain the armature 44 in its open position.

While the particular linear displacement electromagnetic actuators herein shown and described in detail are fully capable of attaining the objects and providing the advantages hereinbefore stated, it is to be understood that they are merely illustrative of the presently preferred embodiments of the invention and that no limitations are intended to the details of construction or design herein shown other than as defined in the appended claims.

What is claimed is:

1. A linear displacement electromagnetic actuator comprising:
    a cylindrical housing member of magnetic material having an encompassing sidewall, an open top and an open bottom;
    upper and lower pole pieces mounted in said open top and said open bottom, respectively, each pole piece having an annular portion and a cylindrical portion;
    a flux transducer encompassing each annular portion;
    an electrical coil encompassing each cylindrical portion;
    an amplifier connected in an electrical circuit with each coil and a respective flux transducer;
    a radially-magnetized, ring-shaped magnet mounted in said housing and forming a cylindrical chamber with said coils and the ends of said cylindrical portions of said pole pieces;
    flow passages mounted in said pole pieces in communication with said chamber;
    a valve seat mounted in one of said passages; and
    a valve member slidably mounted in said chamber for seating on said seat when a first coil is energized and for unseating when a second coil is energized, said ring-shaped magnet maintaining said valve member in its then position after said coils have been de-energized.

2. A linear displacement electromagnetic actuator comprising: a cylindrical body portion of magnetic material having an encompassing sidewall, closed top and bottom walls, an upper cylindrical pole piece depending from said top wall and a lower, cylindrical pole piece upstanding from said bottom wall, said pole pieces being centered on the longitudinal axis of said body portion and having pole faces facing each other in spaced relation; an electrical coil encompassing each pole piece for creating a flux therein; a ring-shaped permanent magnet mounted in said body portion intermediate said coils; an armature slidably mounted in said permanent magnet intermediate said pole faces, whereby said armature is attracted to said upper pole face when the coil encompassing said upper pole piece is energized and to said lower pole face when the coil encompassing said lower pole piece is energized, said permanent magnet maintaining said armature in flux coupling relationship with a particular pole face after the coil serving said particular pole face has been first energized and then de-energized; a flux transducer encompassing each pole piece and an amplifier connecting each transducer in an electrical circuit with one of said coils.

References Cited by the Examiner
UNITED STATES PATENTS

| | | | | |
|---|---|---|---|---|
| 2,279,243 | 4/42 | Parsons | | 251—139 |
| 3,022,450 | 2/62 | Chase | | 317—171 |

MARTIN P. SCHWADRON, *Acting Primary Examiner.*